United States Patent Office 2,824,120
Patented Feb. 18, 1958

2,824,120

PRODUCTION OF PHENYLGLUTARIC ACID

Jay S. Buckley, Jr., Groton, and Rudolph G. Berg, Noank, Conn., assignors to Chas. Pfizer & Co., Inc., Brooklyn, N. Y., a corporation of Delaware No Drawing. Application October 13, 1955
Serial No. 540,338

6 Claims. (Cl. 260—475)

This invention relates to a new and novel process for the preparation of α-phenylglutaric acid and various esters thereof. α-Phenylglutaric acid is useful as an intermediate in the preparation of tetrahydrozoline. Tetrahydrozoline is a valuable pressor agent which is the subject of copending application Serial Number 431,618, filed May 21, 1954, by Martin E. Synerholm et al., now U. S. Patent 2,731,471.

The definite systematic name for tetrahydrozoline is 2-(1,2,3,4-tetrahydro-1-naphthyl) imidazoline. Its formula is given below.

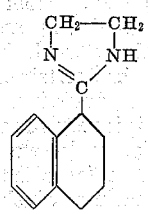

The preparation of tetrahydrozoline involves the heating of 1,2,3,4-tetrahydro-1-naphthoic acid or an ester thereof with ethylenediamine according to techniques well known in the art for the preparation of 2-substituted imidazolines. The required 1,2,3,4-tetrahydro-1-naphthoic acid has been prepared by the chemical reduction of 1-naphthoic acid with sodium and alcohol. However, this type of a reduction is quite hazardous, even on a large laboratory scale, and cannot be considered for commercial production. It has not been possible to control the catalytic reduction of 1-naphthoic acid with sufficient precision to make this a practical method for producing the 1,2,3,4-tetrahydro compound.

An alternative route to 1,2,3,4-tetrahydro-1-naphthoic acid known in the art involves cyclization of α-phenylglutaric acid to 1,2,3,4-tetrahydro-4-oxo-1-naphthoic acid followed by reduction of the keto group. This process is illustrated schematically below.

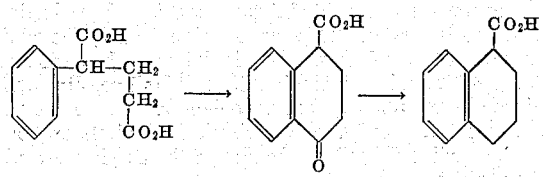

Heretofore, two factors have mitigated against the commercial application of this process. One is the lack of a simple and efficient method of preparing α-phenylglutaric acid and the other is the unwieldiness of known methods for the reduction step. The object of this invention is to provide a simple and economical process for the production of α-phenylglutaric acid. A copending application Serial Number 540,339, filed October 13, 1955, is concerned with a new and improved process for carrying out the reduction step. Suitable processes are known in the art for carrying out the cyclization step. An example of one such method appears at the end of this specification.

The valuable process of this invention for preparing α-phenylglutaric acid can be carried out in the two steps represented below.

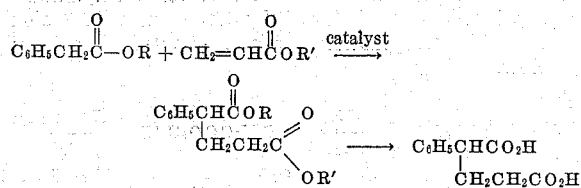

In the above structural formulae, R and R' are lower alkyl groups, straight or branched chained, having less than about eight carbon atoms. Examples of such groups are the methyl, ethyl, butyl, isobutyl, amyl and 2-ethylhexyl groups, etc. Higher alkyl groups are applicable, but the lower alkyl compounds are preferred because they are readily available, and they are in general, more soluble, lower boiling, and convenient to handle.

The unique feature of this process stems from the discovery that under properly controlled conditions, it is possible to effect the conjugate addition of just one mole of the phenylacetic ester to the acrylic ester thus yielding a monoalkylation product. Previous processes for the preparation of α-phenylglutaric acid involve the conjugate addition of a phenylacetic ester or nitrile to acrylonitrile or the addition of phenylacetonitrile to an acrylic ester. None has employed the novel combination of esters of the instant process. The combinations of nitriles or nitriles and esters of the prior art processes have all yielded dialkylation products unless some measure was taken to block one of the α-hydrogen atoms of the phenylacetic acid component. The fact that monoalkylation without resort to blocking groups can be obtained by the use of controlled conditions and the unique combination of esters of this invention is the surprising and critical feature of this process.

In each of the prior art processes based on this type of a conjugate addition step, at least one of the reactants has been a nitrile and in each case it has been necessary to block one of the α-hydrogen atoms of the phenylacetic acid component. This is illustrated in the equations given below. Hydrolysis and decarboxylation of each of the products shown yields α-phenylglutaric acid.

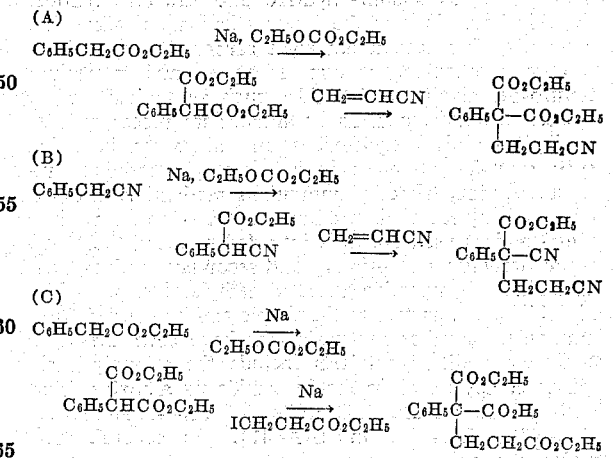

The process of the instant invention is considerably more convenient and economical than related prior art processes. The instant process has only two steps as opposed to at least three for prior art processes A, B, and C above, and higher overall yields are obtained. Thus the process of the present invention is considerably more economical than the prior art methods. Economy is not only the result of higher yields. Other contributing factors are elimination of the need for certain raw materials and the reduction in the number of steps. This effects a savings in labor and equipment due to the reduced production time cycle.

Not all prior art processes involve a conjugate addition step as is common to the above processes. The following process is exemplary. It involves formylation of phenylacetic ester followed by treatment with malonic acid, and hydrogenation. It is represented by scheme D below.

(D)
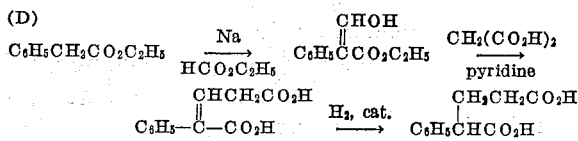

Here again a longer and more complicated process is involved. This process has the added disadvantage of including a hydrogenation step which requires the use of specialized equipment and catalysts which must be either prepared or bought, and also recovered. The process of the instant invention therefore retains its advantages of economy and convenience over process D above.

Conjugate addition referred to above is a term known in the art which is used to describe the process of 1,4-addition across a pair of conjugated double bonds followed by the tautomeric rearrangement of the conjugate addition intermediate to the 3,4-addition product that is isolated. This is illustrated below.

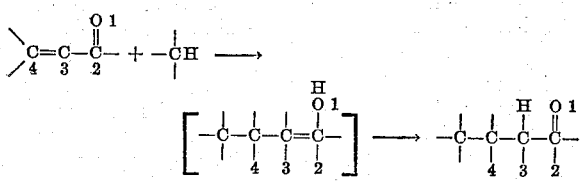

The conjugate addition of an activated carbon atom bearing at least one hydrogen atom to a 1,4-unsaturated system of the type referred to above containing oxygen generally requires the presence of a catalyst for its successful operation. This catalyst is referred to herein as a conjugate addition catalyst. Suitable conjugate addition catalysts include basic substances of a variety of types. Both organic and inorganic bases have been used. Inorganic bases that are frequently applicable include the alkali metals, the alkali metal and alkaline earth oxides and hydroxides, and various alkali and alkaline earth hydrides such as sodium hydride and calcium hydride. Organic bases include the lower alkali metal alkoxides, containing less than about eight carbon atoms, such as sodium methoxide, sodium ethoxide, and potassium t-butoxide, alkali metal amides such as sodium amide, potassium amide, quaternary ammonium bases, such as trialkylammonium hydroxides and alkoxides including such materials such as benzyltrimethylammonium hydroxide, benzyltrimethylammonium methoxide, choline, trimethylethylammonium ethoxide, etc. The term alkali metal amides used above is intended to mean the alkali metal derivatives of primary and secondary amines such as sodium diethylamide, sodium methylamide, potassium piperidide, etc. as well as the simple amides derived from ammonia. Further materials that have been useful as conjugate addition catalysts include the strongly basic ion exchange resins in the hydroxide or alkoxide form such as Dowex 1 and 2, Durolite A–40, A–41, and A–42, IRA–400, IRA–401, and IRA–411. In general, such resins are polymers containing quaternary ammonium groups. For example, a copolymer of styrene and divinyl benzene which has been chloromethylated and treated with a tertiary amine to yield a polyquaternary ammonium chloride is one type that may be employed. This can then be converted into the hydroxide or alkoxide form in which form it is useful as a conjugate addition catalyst. To summarize, suitable catalysts include alkali metals, and the oxides, hydroxides, lower alkoxides, amides and hydrides thereof; the alkaline earth metal oxides, hydroxides, and hydrides; and the quaternary ammonium bases such as the hydroxides, and lower alkoxides including the strongly basic ion exchange resins which contain these groups.

The reaction is preferably carried out by placing the ester of phenylacetic acid and the conjugate addition catalyst in a flask and adding the acrylate ester to the mixture gradually with stirring and cooling. The variables of the process include the choice and amount of catalyst, the proportions of reactants, and the conditions of time and temperature employed. An inert solvent may be used but it is preferred to operate in the absence of a solvent. Inert solvents include polar and non-polar organic liquids that will not react with the basic catalyst employed nor with the acrylic ester. Examples include certain alcohols, such as tertiary butyl alcohol; ethers such as diethyl ether, dibutyl ether, dioxane; and hydrocarbons such as benzene, toluene, xylene, octane, etc. The bulk of the lower aliphatic primary and secondary alkanols are unsatisfactory solvents due to the fact that they will undergo conjugate addition to the acrylate. In general, the reaction rate is reduced considerably when a solvent is used.

Preferred conjugate addition catalysts include the alkali metal alkoxides although other materials of the types listed above may be used. From about 3 to 15 mole percent of catalyst is ordinarily used. The selection of a catalyst must be balanced with the other reaction variables selected. Each has certain advantages and disadvantages. For example, potassium t-butoxide is an excellent catalyst because it is very strongly basic and permits the use of low reaction temperatures and short reaction times. These conditions favor the desired monoalkylation. However, potassium which is required in the preparation of this catalyst is too hazardous to handle to be a practical material to employ on a commercial scale. Sodium methoxide, ethoxide and other lower alkoxides have proven to be very useful catalysts. Although they are not as active as potassium t-butoxide and do not give such high yields and conversions as does the potassium catalyst, they are less hazardous to use and have been found to give adequate results.

The use of approximately equimolar amounts of the phenylacetic ester and acrylic ester is preferred in the process of this invention although in some instances, it is convenient to use an excess of one or the other to counter-balance undesired side reactions. For example, the lower sodium alkoxide catalysts react to some extent with the acrylate ester to give conjugate addition products of the corresponding alcohols. Thus, an excess of the acrylate is desirable and a somewhat larger proportion of alkoxide catalyst is required. A further side reaction that sometimes becomes troublesome at the higher temperatures in the useful range of this process is polymerization of the acrylate ester. This can be minimized by the addition of a basic polymerization inhibitor such as one of the aromatic amines including dimethylaniline, diphenylamine, di-β-naphthyl-p-phenylenediamine etc., to the reaction mixture. Other polymerization inhibitors are also useful. Ordinarily polymerization of the acrylate ester is not a problem.

Side reactions involving the phenylacetic ester are also possible resulting in loss of this reactant. One such reaction involves condensation of two molecules of the ester with one another to give a disubstituted acetoacetic ester. This material is readily decarboxylated yielding dibenzyl ketone as a contaminant. Thus, in some instances an excess of the phenylacetic ester may be desirable. In general, useful mixtures for carrying out this reaction are those comprising equimolar quantities of the two esters as well as those comprising up to about a 50% excess of one or the other of them. In other words from two-thirds to one and a half moles of the phenylacetic ester per mole of acrylic ester are preferably employed. For example, use of sodium methoxide as the catalyst and ethyl phenylacetate and methyl acrylate as the reactants, a temperature of 30° C. for 2.0 hours has been found to be a suitable combination of time and temperature. This set of conditions results in a 67% yield of methyl ethyl α-phenylglutarate. Similarly, with the use of potassium tertiary butoxide, yields of 85 to 95% were obtained operating at temperatures of −25 to +5°. More weakly basic catalysts such as sodium hydroxide or potassium hydroxide accordingly require a combination of a higher reaction temperature and longer reaction time. It has been found that the useful temperature range for carrying out this process is substantially between −40° and +60° C.

After completion of the reaction period, the catalyst is neutralized by the addition of an equivalent quantity of acid. Organic acids may be used as well as the inorganic mineral acids. In fact, it is preferred to use acetic acid or other weak anhydrous acid since the presence of strong aqueous acids favors hydrolysis of the ester. The resulting insoluble salts are preferably removed from the reaction mixture prior to distillation of the product since their presence leads to caking and uneven ebullition which complicates the distillation step. Salt removal may be accomplished by a variety of means such as filtering, centrifuging, or solvent extraction. In a preferred embodiment of the invention, solvent extraction with the system chloroform-water is employed.

The following examples are given to illustrate specific embodiments of this invention and are not to be considered as limiting it in any way. In fact, resort may be had to many variations without departing from the spirit and scope thereof. Examples are also given to illustrate the manner in which the α-phenylglutaric acid produced by the valuable process of this invention may be converted to 1,2,3,4-tetrahydro-4-oxo-1-naphthoic acid.

EXAMPLE 1

Ethyl phenylacetate, 2.46 kg. (15 moles) and 100 g. of sodium methoxide was placed in a 5 l. flask equipped with stirrer, thermometer, and dropping funnel. The reflux condenser was capped with a soda-lime tube and the reaction mixture was protected from the atmosphere with dry nitrogen gas throughout. The mixture was then agitated and 1.29 kg. (15 moles) of methyl acrylate was added during 1.5 hours. The temperature was maintained at 30±5° C. by means of ice cooling. It was noticed in some runs that the reaction ceased to be strongly exothermic during the addition. In these cases, the addition of a further quantity of sodium methoxide was necessary. Stirring was continued for 30 minutes at the above temperature after all of the methyl acrylate had been added. The reaction was then quenched with 120 g. of glacial acetic acid and treated with 1 l. of water, 1 l. of chloroform and 75 ml. of concentrated sulfuric acid to facilitate the separation of the layers. The two layers were separated and the chloroform layer washed with a 1 l. portion of water. The combined aqueous layers were then extracted with two 500 ml. portions of chloroform and the combined chloroform layers dried and the solvent distilled. The remaining liquid was the product methyl ethyl α-phenylglutarate. It was fractionated through a 15 centimeter helices-packed column. It had a boiling point of 148–150° C. and $D_n^{25}=1.4944$. It weighed 2.53 kg. This represented a 67% yield of the desired α-phenyl glutaric ester.

EXAMPLE II

In order to illustrate the effect of the variables of time, temperature, and amounts of reactants on the product produced, a series of experiments was carried out in a fashion similar to that described above in Example I. The results of these runs are tabulated below. The percentage figure in the column headed "Conversion" is the percent of product produced compared to the theoretical weight of product expected on the basis of starting material charged. The yield figure in the last column headed "Yield" is the percent yield of product obtained based on the weight of starting materials consumed. In other words, the yield figure takes into consideration the weight of starting material recovered. In a process of this type where relatively low priced raw materials are employed, even though a given set of conditions may give a high yield, if the conversion is low economical operation is not possible since extensive recyclization of unreacted starting material is necessary.

*Comparative effect of reaction variables on yield and conversion*

| $C_6H_5CH_2CO_2R$ | | $CH_2=CHCO_2R'$ | | Catalyst | | Time (hours) | Temp. (° C.) | Percent Conversion | Yield (Percent) |
| --- | --- | --- | --- | --- | --- | --- | --- | --- | --- |
| R | Moles | R' | Moles | Formula | Amount (g.) | | | | |
| $C_2H_5$ | 0.5 | $CH_3$ | 0.5 | $NaOCH_3$ | 2 | 4 | 20 | 66 | 77 |
| $C_2H_5$ | 0.5 | acrylonitrile | 0.5 | $NaOCH_3$ | 2 | 4 | 20 | 52 | 61 |
| Phenylacetonitrile | 0.5 | $CH_3$ | 0.5 | $NaOCH_3$ | 2 | 2 | 20 | 28 | 50 |
| $C_2H_5$ | 1.0 | $C_2H_5$ | 1.0 | $NaOCH_3$ | 4 | 4 | 20 | 70 | 85 |
| $C_2H_5$ | 0.1 | $C_2H_5$ | 0.1 | $KO$-t-$C_4H_9$ | 0.4 | 3 | 5 | 80 | 84 |
| iso-$C_4H_9$ | 0.1 | iso-$C_4H_9$ | 0.1 | $KO$-t-$C_4H_9$ | 0.4 | 7 | 5 | 79 | 87 |
| $C_2H_5$ | 0.1 | $C_2H_5$ | 0.1 | $KO$-t-$C_4H_9$ | 0.4 | 6 | −25 | 86 | 90 |
| Phenylacetonitrile | 0.5 | $CH_3$ | 0.5 | $NaOCH_3$ | 2 | 4 | 5 | 23 | 41 |

EXAMPLE III

A solution of 240 g. of sodium hydroxide in 2.8 l. of water was prepared and 600 g. (2.4 moles) of the ester from Example I was added to it. This mixture was refluxed with vigorous stirring for three hours. The cooled reaction mixture was then extracted with 500 ml. of chloroform and the aqueous layer acidified with 200 ml. of concentrated sulfuric acid. The α-phenylglutaric acid separated and was collected by extracting with several portions of chloroform. The combined extracts were dried and the solvent removed leaving the α-phenylglutaric acid.

EXAMPLE IV

The α-phenylglutaric acid obtained from a run of the scale described in Example III was treated with 1.2 l. of concentrated sulfuric acid at such a rate that the internal temperature remained above 90° C. This required about 15 minutes. The reaction mixture was maintained at 98–100° C. for an additional 15 minutes and allowed to cool to room temperature. This solution was then added during about 45 minutes to 5 l. of cold water contained in a 12 l. flask. Efficient stirring was continued throughout the addition and the aqueous suspension was seeded with an authentic sample of 1,2,3,4-tetrahydro-4-oxo-1-naphthoic acid after about 100 ml. of the above sulfuric acid solution had been added. The temperature was maintained at 25–30° C. during this process by means of external cooling. The product was collected on a filter after a digestion period of one hour and the keto acid was washed with water until the pH of the washes exceeded 1.5. Eight 100 ml. portions of cold water were required. The product was air dried at 55–60° C.

It weighed 271 g. and had a melting point of 94–95.5° C. The neutral equivalent of this product was 191 which compares favorably with the calculated value of 190 for 4-keto-1,2,3,4-tetrahydro-1-naphthoic acid. A second crop of the keto naphthoic acid can be obtained from the filtrate by solvent extraction with chloroform and recrystallization of the so-obtained material from toluene. This increases the total yield to about 300 g. which is 77% theoretical based on the methyl ethyl α-phenylglutarate charged to the hydrolysis step.

What is claimed is:

1. The process for preparing a lower alkyl diester of α-phenylglutaric acid which comprises the steps of mixing a lower alkyl ester of phenylacetic acid with 3–15 mole percent of a 1,4-addition catalyst, adding thereto from ⅔ to 1½ moles of a lower alkyl ester of acrylic acid per mole of lower alkyl ester of phenylacetic acid at a temperature substantially in the range of −40° C. to +60° C., and recovering α-phenylglutaric diester.

2. The process of claim 1 wherein the catalyst is neutralized prior to recovery of the diester.

3. The process of claim 1 wherein the diester is recovered by solvent extraction.

4. The process for preparing α-phenylglutaric acid which comprises the steps of mixing a lower alkyl ester of phenylacetic acid with 3–15 mole percent of a 1,4-addition catalyst, adding thereto from ⅔ to 1½ moles of a lower alkyl ester of acrylic acid per mole of lower alkyl ester of phenylacetic acid at a temperature substantially in the range of −40° C. to +60° C., recovering α-phenylglutaric diester, and hydrolizing recovered diester.

5. The process of claim 4 wherein hydrolysis of the diester is carried out in an aqueous alkaline solution and α-phenylglutaric acid is recovered therefrom.

6. The process of claim 5 wherein recovery of α-phenylglutaric acid comprises acidification and solvent extraction of hydrolysis mixture.

References Cited in the file of this patent

Hickinbottom: "Reactions of Organic Compounds," pp. 35–6 (1948).